United States Patent [19]
Miyasaka et al.

[11] Patent Number: 5,810,479
[45] Date of Patent: Sep. 22, 1998

[54] HYDRODYNAMIC THRUST POROUS BEARING

[75] Inventors: Motohiro Miyasaka; Makoto Kondo, both of Matsudo; Shigeru Otsuka, Kadoma, all of Japan

[73] Assignees: Hitachi Powdered Metals Co., Ltd., Chiba; Matsushita Electric Industrial Co., Ltd., Osaka, both of Japan

[21] Appl. No.: 813,203

[22] Filed: Mar. 7, 1997

[30] Foreign Application Priority Data

Mar. 8, 1996 [JP] Japan ................................ 8-080571

[51] Int. Cl.$^6$ ........................................ F16C 32/06
[52] U.S. Cl. .................................... 384/107; 384/902
[58] Field of Search ................................ 384/107, 902, 384/111, 112, 121, 123

[56] References Cited

FOREIGN PATENT DOCUMENTS

| | | |
|---|---|---|
| 50-35552 | 4/1975 | Japan . |
| 56-90119 | 7/1981 | Japan . |
| 58-623 | 1/1983 | Japan . |
| 57-63121 | 4/1983 | Japan . |
| 7117099 | 1/1989 | Japan . |
| 85369 | 1/1990 | Japan . |
| 730786 | 1/1992 | Japan . |
| 5111209 | 4/1993 | Japan . |
| 5111210 | 4/1993 | Japan . |
| 518489 | 5/1993 | Japan . |
| 6221324 | 8/1994 | Japan . |

*Primary Examiner*—Lenard A. Footland
*Attorney, Agent, or Firm*—Birch, Stewart, Kolasch & Birch, LLP

[57] ABSTRACT

A hydrodynamic thrust porous bearing having excellent sliding characteristics under the use conditions of not only radial load but also thrust load, which bearing is approximately cylindrical in configuration and receives thrust load on its axial end face and is characterized in that the bearing includes protruded portions disposed radially relative to its center, tapered portions formed on at least one side of the protruded portions, and depressed portions defined by the bottom part of the tapered portions in at least three positions in the thrust receiving axial end face, and the bearing further includes grooves in the inner peripheral surface at the positions corresponding to the depressed portions.

13 Claims, 4 Drawing Sheets

Fig. 1(a)  Fig. 1(b)
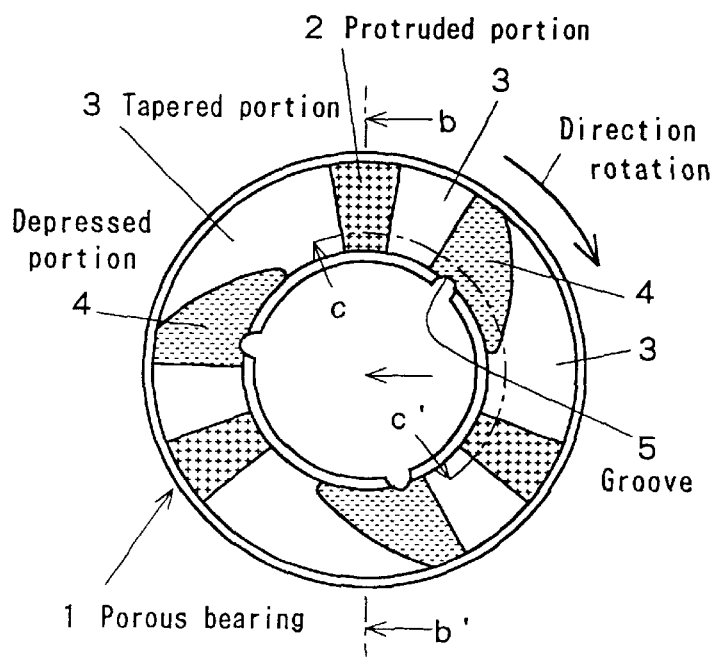
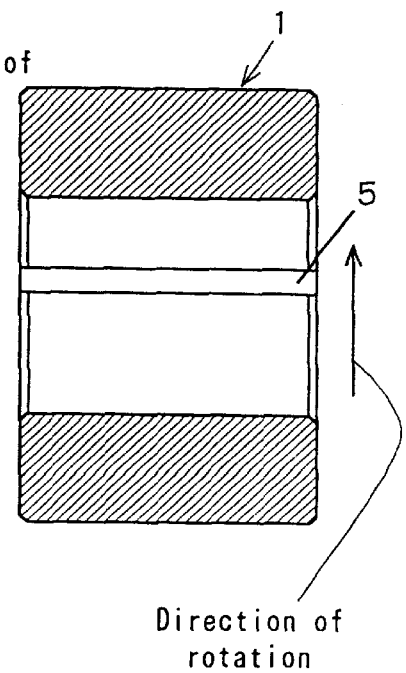
Fig. 1(c)
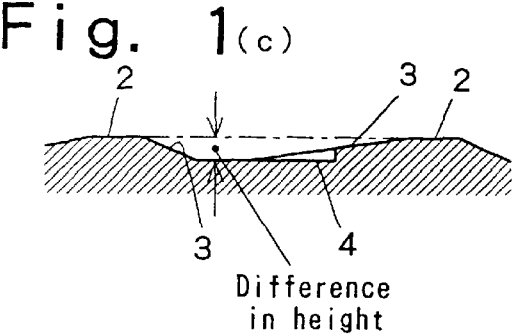

HYDRODYNAMIC THRUST POROUS BEARING

BACKGROUND OF THE INVENTION (1) Field of the Invention

This invention relates to a porous bearing for electric motors and the like which receive both radial load and thrust load. More particularly, the invention relates to a bearing device suitable for a spindle motor and the like which has various excellent properties in long service life, low shaft friction loss, less vibration, low noise, and low shaft end play.

(2) Prior Art

An oil impregnated sintered-metal bearing have shown excellent sliding characteristic in view of the sliding in the radial direction owing to its oil circulating action generally referred to as pumping action and the wedge effect and so forth. However, it has failed to achieve adequate sliding characteristic regarding the sliding in a thrust direction because of the absence of mechanisms of oil supply and oil pressure generation.

Japanese Laid-Open Patent Publication No. 01-12121 discloses an oil impregnated sintered bearing, in which the axial end face is formed into a three dimensional uneven wavy configuration having peaks in at least three points both in the peripheral and radial directions. The bearing according to this patent is intended to receive loads in the thrust direction with supporting thrust load on the protruded portions while forming oil film and supplying the oil on the sliding surface of the bearing with the help of positive and negative pressures of lubricant oil caused by the gaps among the protruded portions and depressed portions.

An oil impregnated sintered bearing with the purpose of receiving loads in a thrust direction on the axial end face, is disclosed in Japanese Laid-Open Utility Model Publication No. 57-63121, in which bearing includes axial end faces comprising uneven portions so as to generate hydrodynamic pressure. According to this utility model gazette, the axial end face of the bearing has optional number of shallow depressed portions formed with two dimensional inclined plain defined by straight lines wherein the inclination angle is less than 20° relative to the axis of the bearing and their maximum depth is less than 0.3 mm. The purpose of this invention is to improve the sliding conditions of the bearing by generating hydrodynamic pressure through wedge effect as well as to utilize the depressed portion as an oil supply base.

Japanese Patent Publication No. 63-33010, also discloses a bearing having a similar axial end face with uneven portions (tapered land shape), although it is not oil impregnated sintered bearing. In the bearing according to this patent, the axial end face is formed with tapered land portions in which land portion has also slight tapered surface with a taper angle of more moderate than that of the tapered portion, that is the tapered portion is formed in two stages. It is intended to achieve improved sliding characteristic by increasing load carrying capacity with the tapered land portions which create higher hydrodynamic pressure than simple land portions without taper.

Meanwhile, an oil impregnated sintered bearing having axial end face which is provided simply with grooves is disclosed in Japanese Laid-Open Patent Publication No. 50-35552. The bearing of this patent has the structure that a plurality of grooves are formed in the axial end face, which grooves are radial from the center of the bearing bore. The bottom portions of the grooves are made denser than other portions of the bearing in order to return the oil in the grooves accumulated with the rotation by avoiding the permeation of oil into the inside of bearing. The main object of this patent is also to improve the sliding characteristic of the bearing in a thrust direction.

The example of an oil impregnated sintered bearing which is provided with grooves on the axial end face of bearing without the purpose of sliding in thrust direction, is disclosed in Japanese Laid-Open Patent Publication No. 58-623. In this bearing, a plurality of grooves are formed on the axial end face radially extending from the center of the bearing bore and a large chamfer is formed in the surface of the bearing bore. Bearings have generally chamfers, however, the bearing according to this patent employs a large chamfer and grooves extending from the chamfered portion toward the outer periphery of the bearing. It is intended to lead the oil which oozes out from the inner peripheral surface of the bearing toward the outer periphery of the bearing without spreading the oil through these grooves and to recover the oil in the peripheral portion of the bearing, thereby preventing oil from spreading and attaining to prolong the service life of bearing.

Although they are not thrust bearings, Japanese Patent Application No. 3-263518 and No. 3-270739 disclose bearings which are provided with straight or spiral grooves having triangular cross section extending from the longitudinal center of the bearing toward one axial end face with gradually increasing its depth and width. The inner peripheral sliding surface is almost non-porous, so that this patent intends to promote active oil supply from the grooved portion during rotation and thereby generating hydrodynamic pressure on the inner sliding surface in order to improve sliding characteristic of the bearing in the radial direction.

All the prior arts mentioned above are based on the mechanism proposed to generate hydrodynamic pressure through providing uneven portions or tapered portions on the end face of the bearing in order to enable for the oil existing on the axial end face to contribute effectively to the sliding in a thrust direction. The grooves provided on the axial end face are intended to be used for the purpose of oil storage and preventing oil scattering. However, there has been few prior art in which a bearing makes use of the correlation between the sliding on the axial end face and the sliding on the inner or outer peripheral surface, particularly on the inner peripheral surface in order to improve sliding characteristic in a thrust direction. As described above, only the bearings incorporating chamfered portions and grooves, or those incorporating only gradually widening grooves on the inner peripheral surface in the vicinity of the axial end face are disclosed.

Among the above described bearings, the thrust bearing including an axial end face having three dimensional uneven portions in wavy shape at three or more portions achieves excellent sliding characteristics. However it posses a number of disadvantages in view of production and application of the bearing such as difficulty in ensuring dimensional accuracy in the production of metal mold used to form complex axial end face of the bearing, difficulty in reducing the production cost of mold, relatively low thrust load-carrying capacity because of the substantial point contact necessitated by the wavy protruded and/or depressed portions, and requiring prolonged time to give stable sliding characteristics in view of the running-in of contact surfaces.

There have been proposed bearings having tapered depressed portions or those with varied taper angles formed on a part of axial end face. These bearings aim the effect of hydrodynamic pressure generation in the tapered portion. Among these, when the bearing is made of porous material, sliding characteristic in a thrust direction may be sometimes improved owing to the effect of hydrodynamic pressure to some extent. However, in this type of bearing, the optimum speed of rotation and position of the tapered portion to generate effective hydrodynamic pressure are determined directly since the tapered portion is a two dimensional plain defined by straight lines. Therefore, the bearing is effective only at a limited rotation speed in a narrow range and at certain position on the axial end face. So that, the hydrodynamic pressure generating action can not be expected in a wide range of rotation speed. Accordingly, the bearing with such a design has disadvantages in practical uses in view of limited use conditions and narrow applicability, and as a result, it has a problem in its durability.

Concerning the point of oil supply, the bearing of this type possesses critical problems in that adequate sliding characteristics can not be expected due to oil shortage because it is hard to ensure enough oil supply which relies on the oil leaked from clearances and the oozing out of oil due to the thermal expansion of the oil by the frictional heat of sliding portion on the inner peripheral surface of the bearing. In connection with this problem, the thrust bearing made of aluminum based metal, which is said to have solid lubricant property, having tapered lands with a plurality of taper angles, is particularly affected because this bearing does not possess self lubricating action (pumping action) by oil, then it cannot be expected that it functions effectively as a tapered land thrust bearing if it is not provided with constant oil supply and the limitation in proper rotation speed.

In the bearing which has an axial end face with a plurality of radially disposed grooves, especially the one having dense grooved portions, it is intended to accumulate oil in the grooved portion and to improve the sliding characteristic of the bearing. Even in this bearing, there remains still a difficulty in how to retain the original amount of oil during operation because of the absence of mechanism of positive oil supplying to the axial end faces of the bearing similarly with the cases stated above. With the bearing of this type, it is possible to ensure adequate thrust sliding characteristic over the prolonged period in comparison with the bearing without high density grooves, however, it is difficult to expect durability or to maintain and improve the sliding characteristic over a prolonged period because there is no consideration to oil supplying to the axial end face. In order to improve thrust sliding characteristic of the bearing, there is also disclosed a method of forming large chamfer in the inner peripheral surface of the bearing and the provision of grooves extending toward outer periphery in the axial end face of the bearing. This is based on the idea that the formation of large chamfer helps to reduce the amount of oil leakage by leading the oil leaked from the clearance between the shaft and the inner peripheral surface, to the grooves in the axial end face along the shaft. While this method is effective in view of the recovery of oil, there is no consideration to the thrust sliding because this bearing is not made on the premise of the sliding on the end face. Furthermore, any positive oil supplying action is not observed in view of the oil movement to the axial end face.

In addition, there is proposed another method similar to the above-mentioned one that the inner peripheral surface of the bearing is provided with straight or spiral grooves having triangular cross section extending from the longitudinal center of the bearing bore to one of axial end faces and broadening toward the axial end face with gradually increasing depth and the bearing sliding surface is made almost non-porous. It is intended in this method to supply oil positively from the grooved portion with the rotation and generate the hydrodynamic pressure at the inner peripheral sliding surface. Because it is the main purpose in this method to retain the oil on the inner peripheral surface, the effect in radial sliding can be expected, however, any consideration to the sliding in the thrust direction is not given, so that this method has no oil supplying function to the axial end faces. Moreover, in view of the complexity of the shape and structure of the bearing, the bearing of this type has a number of disadvantages in the difficulty of manufacturing, the maintaining of dimensional accuracy, the controlling of oil pores and the cost reduction.

BRIEF SUMMARY OF THE INVENTION

It is, therefore, the object of the present invention to solve the problems in the prior art as described above and as a result of extensive studies, the present invention has been accomplished.

The bearing according to the present invention is a hydrodynamic thrust porous bearing having approximately cylindrical shape which receives thrust load on the axial end surface and radial load on the inner peripheral surface thereof, which is characterized in that at least three protruded portions are radially disposed relative to the bore center of the bearing on the thrust receiving axial end surface of the bearing, tapered portions are formed at least one side of each of said protruded portions, and depressed portions are formed at the bottom part of said tapered portions, and grooves are formed at the positions corresponding to said depressed portions in the inner peripheral surface of said bearing. The bearing of the present invention achieves excellent sliding characteristic in a thrust direction. It is to be noted that, according to the present invention, the bearing of the invention is also useful to have depressed portions formed spirally on the axial end faces with gradually decreasing in width along the direction of the shaft rotation coupled with the grooves formed at the position corresponding to the maximum width of said depressed portion on the inner peripheral surface of the bearing.

Moreover, further improved lubrication effect can be expected with a hydrodynamic thrust porous bearing having protruded portions radially disposed relative to the bore center of said bearing in at least three positions on the axial end surface of said bearing, tapered portions formed at least in one of said protruded portions, and depressed portions formed spirally adjacent to said tapered portions, the width of which decreases gradually toward the inner peripheral surface or outer peripheral surface or toward the tip end of the arrowhead shape and grooves are formed on the inner surface of said bearing at the position corresponding to the maximum width of said depressed portions. In addition, when the number of radially disposed protruded portions is a prime number of three or more, the effect to reduce the noise and vibration can be attained.

According to the present invention, grooves are formed on the inner peripheral surface (bearing surface) with an angle of less than 45° relative to the longitudinal direction of the shaft and the difference in height between the protruded portions and the depressed portions is in the range of 5 to 100 $\mu$m. The depressed portions formed on the axial end faces of the bearing decreases in width toward the inner or outer periphery or in the form like an arrowhead shape. The lines defining the width of the depressed portions are straight or curved lines or their combined lines which begin with an angle in the range of 5 to 45° against the tangential line to the inner or outer peripheral surface. All these features enable the bearing according to the present invention to achieve its maximum performance as a thrust bearing. According to the present invention, it is also possible to form relieved (depressed) portions, diameter of which is made larger than that of the inner peripheral surface portion receiving shaft, disposed lengthwise on the part of the peripheral surface and to provide grooves on the outer peripheral surface of the bearing or both on the outer and inner peripheral surface.

BRIEF DESCRIPTION OF THE DRAWINGS

The present invention will become more fully understood from the detailed description given hereinafter and the accompanying drawings which are given by way of illustration and they are not limitative of the present invention, in which:

FIG. 1(a) to FIG. 1(c) show a first embodiment of the hydrodynamic thrust porous bearing of the present invention, wherein FIG. 1(a) is a side view of the bearing, FIG. 1(b) is a cross sectional view taken on the line of b–b' in FIG. 1(a) and FIG. 1(c) is a cross sectional view taken on the line of c–c' in FIG. 1(a);

FIG. 2(a) to FIG. 2(c) show a second to fourth embodiments of the hydrodynamic thrust porous bearings of the present invention, respectively, wherein FIG. 2(a) is a side view of the second embodiment of the bearing, FIG. 2(b) is a side view of the third embodiment and FIG. 2(c) is a side view of the fourth embodiment;

FIG. 3(a) to FIG. 3(c) show inner peripheral surfaces of the second to fourth embodiments of the hydrodynamic thrust porous bearings of the present invention, respectively, wherein FIG. 3(a) is a vertical cross sectional view of the inner peripheral surface of the second embodiment, FIG. 3(b) is a vertical cross sectional view of the inner peripheral surface of the third embodiment and FIG. 3(c) is a vertical cross sectional view of the inner peripheral surface of the fourth embodiment; and FIG. 4(a) and FIG. 4(b) show a fifth embodiment of the bearing, wherein FIG. 4(a) is a side view of the fifth embodiment and FIG. 4(b) is a partially cross sectional side view of the bearing taken on the line b–b' in FIG. 4(a).

DETAILED DESCRIPTION OF PREFERRED EMBODIMENT

Figure 2A:
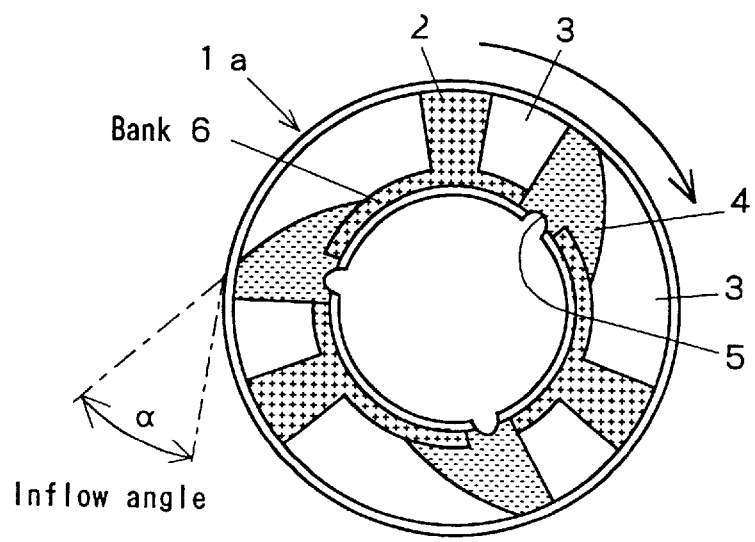

The thrust bearing according to this invention is especially excellent in solving the problems in the conventional art in thrust sliding, which provides improved thrust sliding characteristics owing to the interaction between various shapes formed on the axial end faces such as tapered land portions, pump-in portions, pump-out portions, arrowhead shaped portions and their combinations and grooves formed on the inner peripheral surface. The mechanism of the present invention will hereinafter be described.

On the inner peripheral surface of porous bearing, lubricated sliding take places with both oil circulation action referred to as pumping action and wedge effect of oil. It is also known that when grooves are formed in the inner peripheral surface, the functions to store the oil and to generate hydrodynamic pressure is produced. The oil stored in the grooves is forced out toward the axial end faces along the grooves due to the driving force attributed to the viscosity of lubricant, hydrodynamic pressure, thermal expansion and so forth as the shaft rotates and is finally moved to the axial end faces of the bearing. The oil moved to the axial end faces of the bearing is constantly fed to the space formed by the thrust plate and the rotor boss portion or the like which are held in contact with the depressed portions and protruded portions. With the rotation of the rotor, they give improved lubrication for the thrust sliding by moving to the tapered portions, pump-in portions and so forth together with generating hydrodynamic pressure in the direction to the end face. In this tapered portions and pump-in portions, the generation of hydrodynamic pressure takes place and at the same time, the oil circulation action at the axial end faces receiving thrust also takes place owing to the oil partially returned to the inside of the bearing through pores existing on the axial end face of the bearing. For example, a higher thrust load capacity can be obtained by the complex form of the end face with the pump-in portions and tapered land portions to give a desirable lubricating condition in the end face. Furthermore, by giving previously a certain area to the protruded portion, the time for running-in is almost unnecessary and the precision of the inclination of rotor can be attained.

The number of protruded and depressed potions in the axial end surface must be three or more in view of the stability of sliding. When the number is less than two, the sliding condition of the bearing will become unstable. However, if the number is three or more, by selecting the number from prime numbers, further stable shaft rotation can be attained without accompanying abnormal vibration or resonance noise because of the absence of synchronization with various frequencies generated with the rotation.

If the groove on the axial end face is set to have a skew angle against the longitudinal direction, that is, axial direction of the bearing, the groove becomes more effective in improving sliding properties in thrust direction particularly at low speed rotation, because positive oil supply to the axial end face is promoted and large hydrodynamic pressure is created on the inner peripheral surface of the bearing. This skew angle is preferably less than 45° against the longitudinal direction of the bearing. A skew angle exceeding 45° is undesirable because oil supplying action toward the axial end face will be weakened. Moreover, in the case of the group with an angle from which the oil is moved in the directions of both ends or even in the case of the group which sends the oil to the edge surface of severer sliding condition, it is flexible that the formation of grooves is optional, so that the grooves can be formed so as to demonstrate an enough effect. The cross sectional shape of the groove is not particularly limited in this bearing according to the present invention. That is, with any grooves having a cross sectional shape such as a rectangle, semicircle, a half oval or triangle, the above-described effects can be produced. However, when hydrodynamic pressure in a radial direction is especially demanded, it is necessarily to take into account the cross sectional shape of the groove.

In addition, an improved thrust sliding characteristic is achieved by setting the difference in height of the protruded portion and depressed portion in the axial end face of the bearing to be in the range of 5 to 100 $\mu$m. In the case that the difference in height is less than 5 $\mu$m, enough oil pressure difference between the oil supplying portion and the oil pressure generating portion is not created and accordingly, the protruded and depressed portions are unable to attain effective hydrodynamic pressure generating action. Meanwhile, when the height difference is over 100 $\mu$m, it is hard to ensure constantly an enough supply of oil to the clearances formed among the protruded portions and depressed portions. As a result, the protruded and depressed portions are also unable to produce effective hydrodynamic pressure. Although there is not any particular limit with respect to the angle of the tapered portion in the end face of the bearing against the axial direction, the adequate angle is preferably a value corresponding to the inclination of 2 to 20 µm per 1 mm in length. In the range of this angle, the hydrodynamic pressure is effectively generated and thereby improving the thrust sliding characteristics.

With regard to the inflow angle to the pump-in portion, if the shape of the spiral depressed portion forming the pump-in portion is defined by curved lines, its tangent line is preferably in the range of 5° to 45° against the tangent line to the inner periphery or outer periphery of the bearing. Meanwhile, if the spiral depressed portion is defined by straight lines, the straight lines themselves is also preferably in the range of 5° to 45° against the tangent line to the inner periphery or outer periphery of the bearing. When this angle is less than 5°, enough pump-in effect may not be expected because a large pressure loss takes place due to a large resistance against the oil flow. Similarly, hydrodynamic pressure generating action owing to pump-in effect may not be expected when the angle is over 45° due to the short and steep flow passage. Eventually, sufficient improvement in sliding on the axial end face cannot be attained. It is also possible to achieve useful effects such as reducing the lowering of load carrying capacity in the radial direction which is caused by the excess oil supply to the axial end face of the bearing, ensuring the oil storing points for running-in oil, and reducing the shaft friction loss in the sliding in the radial direction by providing depressed portions having a larger diameter than that of shaft receiving portion and disposed lengthwise on the part of the inner peripheral surface. In addition, it is to be noted that the location of axial groove is not necessarily limited to the inner peripheral surface of the bearing. It can be optionally formed in the outer peripheral surface, which groove effectively functions as an oil storing mechanism and the oil can be supplied to the axial end face of the bearing. Owing to the increased surface area, the cooling effect to the bearing may also be expected. It is accepted to provide grooves both on the inner and outer peripheral surfaces of the bearing in order to achieve these purposes described above, however, caution have to be taken so as to avoid the lowering of load carrying capacity in the thrust direction when the grooves are formed in the bearing which has pump-in portion or tapered land portion in the axial end face. By the way, only oil is exemplified as a hydrodynamic pressure generation medium, however, it is possible to produce the same effect with any material other than oil such as grease or magnetic fluid or the like, if it can be used for impregnating the pores of the porous bearing.

EMBODIMENTS

FIG. 1 illustrates the structure of a first embodiment of a hydrodynamic thrust porous bearing in accordance with the present invention. FIG. 1(a) is an end view of the bearing. FIG. 1(b) is a vertical sectional view taken on the line b–b' of FIG. 1(a). FIG. 1(c) is a sectional view taken on the line c–c' of FIG. 1(a).

As shown in FIG. 1(a), the hydrodynamic thrust porous bearing 1 includes protruded portions 2 (tapered land portions) at three locations in the axial end face. Tapered portions 3 are formed on both sides of the protruded portions 2. The taper angle of the tapered portions 3 locating on the upstream side of the protruded portion 2 along the direction of rotation indicated with an arrow [for example, the tapered portions 3 on the left side of the protruded portion 2 in FIG. 1(a)] has moderate taper so as to create hydrodynamic pressure. As shown in FIG. 1(a), the hydrodynamic thrust porous bearing 1 also includes depressed portions 4 having pump-in shape adjacent to the tapered portion 3. As will be understood in view of the cross section in FIG. 1(c), the depressed portion 4 keeps its depth on the half way of the tapered portion 3 (this shows the depression in the pump-in shape). The width of depressed portion 4 is gradually decreased by a curve along the direction of shaft rotation. In addition, the bearing 1 is provided with grooves 5 having a semicircular cross section on the inner peripheral surface at positions corresponding to the maximum width portions of the depressed portions 4 in the pump-in shape, one of which grooves 5 is locate at the lowest portion of the axial end face. This bearing 1 has been proved to demonstrate improved sliding characteristic in the thrust direction particularly at low speed rotation in comparison with those having only tapered land portions or depressed portions of pump-in shape on the axial end face.

FIG. 2 illustrates the structure of the axial end face of various types of bearings. FIG. 2(a) is an end view of a second embodiment of a hydrodynamic thrust porous bearing 1a which is formed with banks 6 having the same height as that of the protruded portions 4, around the inward end of the axial end face. The bank 6 serves to raise the hydrodynamic pressure on the sliding surface, thereby improving the thrust load carrying capacity, inclination of the rotor shaft and frequency characteristic of jitters. The symbol α in the drawing denotes an inflow angle.

Figure 2B:
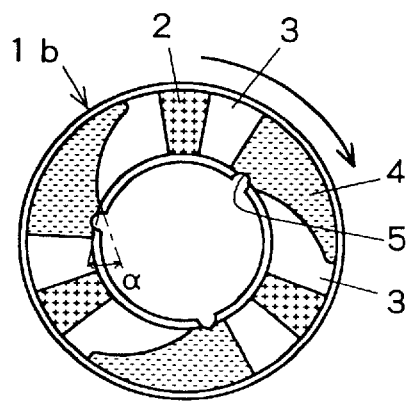

FIG. 2(b) is an end view of a third embodiment of a bearing 1b which is provided with and axial end face having a composite shape composed of protruded portions 2, tapered portions 3 having tapered land portions and depressed portions 4 in a pump-out shape.

Figure 2C:
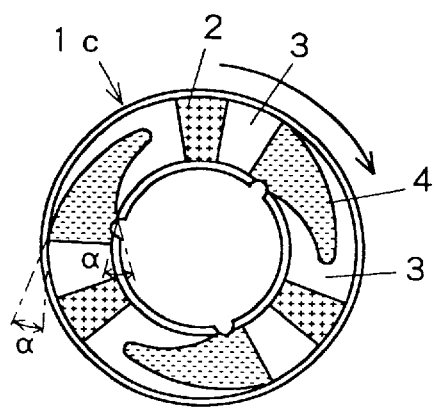

FIG. 2(c) is an end view of a fourth embodiment of a bearing 1c which is provided with an axial end face having a composite shape composed of protruded portions 2, tapered portions 3 having tapered land portions and depressed portions 4 in an arrowhead shape in accordance with the present invention. As a result of the hydrodynamic pressure generating effect in the axial end face of the bearing, this bearing as well as those shown in FIG. 2(a) and FIG. 2(b) have demonstrated almost the same performance in view of the load carrying capacity as that of the embodiment in FIG. 1.

Figure 3A:
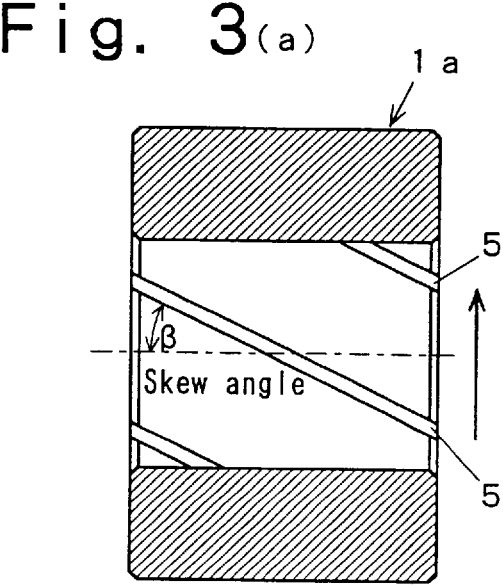

FIG. 3 illustrates examples of grooves in various shapes which are formed in the inner peripheral surface of bearings according to the present invention. FIG. 3(a) is a vertical sectional view of the grooves provided in the inner peripheral surface of the bearing 1a, the second embodiment of the bearing and the grooves 5 are inclined by a skew angle β. In this embodiment, the grooves 5 enable to generate directional flow resistance and hydrodynamic pressure with the rotation, thereby increasing the amount of oil supply toward the axial end face on the left side.

Figure 3B:
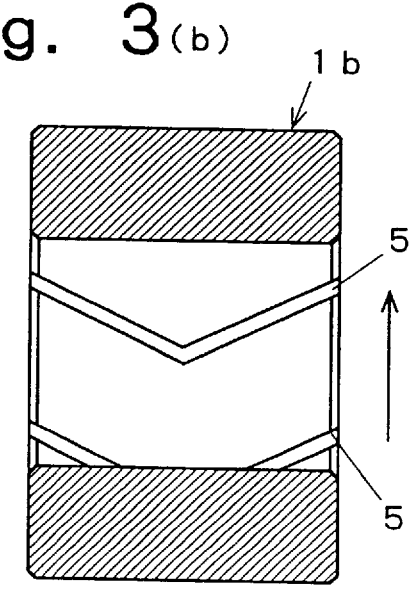

FIG. 3(b) is a vertical sectional view of the grooves formed in the inner peripheral surface of the bearing 1b of the third embodiment. The grooves in this embodiment gives oil supply to both axial end faces of the bearing when the thrust sliding takes place in both the axial end faces of the bearing.

Figure 3C:
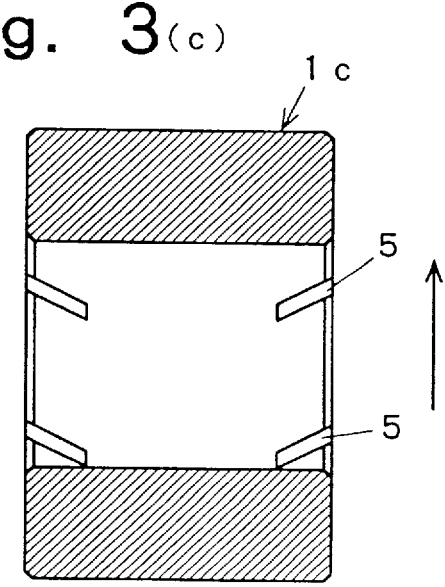

FIG. 3(c) is a vertical sectional view of the inner peripheral surface of the fourth embodiment having grooves to supply oil to both end faces like the embodiment shown in FIG. 3(b). It was confirmed that both the bearings shown in FIG. 3(b) and FIG. 3(c) provided good oil supply to both end faces.

Figure 4A:
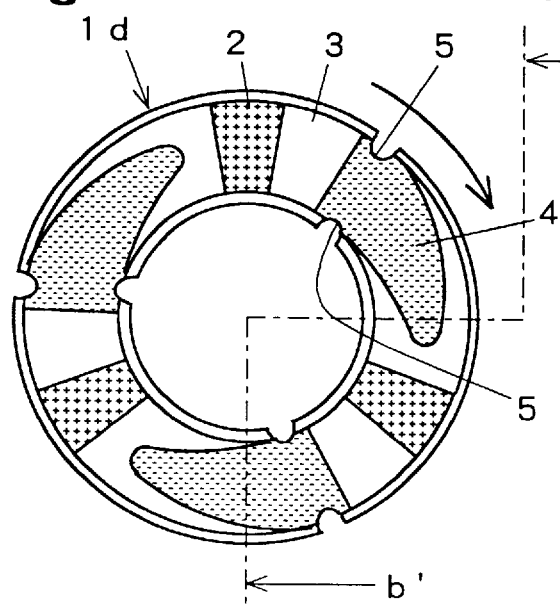
Figure 4B:
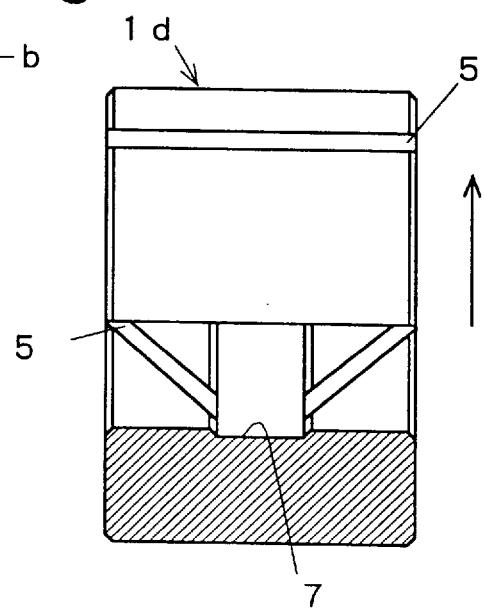

FIG. 4 illustrates a fifth embodiment of a bearing, which has thrust receiving end faces in a composite shape on both sides and each end face is provided with protruded portions 2, tapered portions 3 having tapered land portions and depressed portions 4 in an arrowhead shape. It is further provided with a relieved inner peripheral surface portion 7 and grooves 5 formed on both inner and outer peripheral surfaces in accordance with the invention. FIG. 4(a) is an end view of a bearing 1d. FIG. 4(b) is a partial vertical sectional view taken on the line b–b' of FIG. 4(a).

The bearing in this embodiment demonstrates remarkable effect in reducing the no-load current with the motor which is highly susceptible to shaft friction loss, although the performance of the bearing concerning the load carrying capacity in the thrust receiving end face is almost the same as those of the foregoing embodiments. As a result, overall reliability of the bearing has been improved owing to the effects in reducing the rise of bearing temperature with increasing the allowance for the use of running-in oil.

The advantage attained by the present invention is the provision of a porous bearing which is used under the operating conditions receiving radial and thrust loads simultaneously and demonstrate excellent sliding characteristic both in a thrust and radial directions. Especially, the porous bearing of the present invention demonstrates remarkable effect in prolong reducing nife, saving energy, reducing noise and reducing vibration owing to the increased thrust load carrying capacity, decreased shaft friction loss and lowered bearing operating temperature in the thrust sliding characteristics under the severe sliding conditions for the porous bearing. This has been achieved for the first time by utilizing the mechanism of the present invention that oil is positively and constantly supplied from the inner peripheral surface to axial end face of the bearing. Accordingly, it has become possible to provide an inexpensive and high-performance porous bearing, with which excellent thrust sliding can be done even under the conditions of low speed rotation or high load in which the durability has not been expected in the conventional art. Further, it is possible to expand the uses of the porous bearings.

In addition, this invention offers other advantages in the manufacturing method of the bearing by combining two dimensional planes into three dimensional configuration, so that the reproducibility of the precision in the manufacturing of metal mold for the bearing is much improved, the production cost for the mold is reduced and the yield rate is much improved. As a result, all these advantages will make significant contribution to improve the productivity in the bearing manufacture and to reduce the cost of bearings.

What is claimed is:

1. In a hydrodynamic thrust porous bearing which is approximately cylindrical in configuration and receives thrust load on its axial end face and radial load on its inner peripheral surface, the improvement which is characterized in that said bearing includes protruded portions disposed radially relative to its center in at least three positions in said axial end faces to receive thrust load, tapered portions formed on at least one side of said protruded portions and depressed portions defined by the bottom part of said tapered portions, and said bearing further includes grooves in said inner peripheral surface at the positions corresponding to said depressed portions.

2. In a hydrodynamic thrust porous bearing which is approximately cylindrical in configuration and receives thrust load on its axial end face and radial load on its inner peripheral surface, the improvement which is characterized in that said bearing includes protruded portions disposed radially relative to its center in at least three positions on said axial end faces receiving thrust load and depressed portions each having a spiral shape and width gradually decreasing toward the inner periphery of said axial end face along the direction of the shaft rotation and being formed in the position between said protruded portions, and said bearing further includes grooves in said inner peripheral surface in the positions corresponding to the maximum width of said depressed portions.

3. In a hydrodynamic thrust porous bearing which is approximately cylindrical in configuration and receives thrust load on its axial end face and radial load on its inner peripheral surface, the improvement which is characterized in that said bearing includes protruded portions disposed radially relative to its center in at least three positions on said axial end faces receiving thrust load and depressed portions each having a spiral shape and width gradually decreasing toward the outer periphery of said axial end face along the direction of the shaft rotation and being formed in the position between said protruded portions, and said bearing further includes grooves in said inner peripheral surface in the positions corresponding to the maximum width of said depressed portions.

4. In a hydrodynamic thrust porous bearing which is approximately cylindrical in configuration and receives thrust load on its axial end face and radial load on its inner peripheral surface, the improvement which is characterized in that said bearing includes protruded portions disposed radially relative to its center in at least three positions on said axial end faces receiving thrust load and depressed portions each having an arrowhead shape and width gradually decreasing from both the inner periphery and outer periphery to arbitrary radius of said axial end face along the direction of the shaft rotation and being formed in the position between said protruded portions, and said bearing further includes grooves in said inner peripheral surface in the positions corresponding to the maximum width of said depressed portions.

5. In a hydrodynamic thrust porous bearing which is approximately cylindrical in configuration and receives thrust load on its axial end face and radial load on its inner peripheral surface, the improvement which is characterized in that said bearing includes, in at least three positions in said axial end faces to receive thrust load, protruded portions disposed radially relative to its center, tapered portions formed on at least one side of said protruded portions, and depressed portions adjacent to said tapered portions having spiral shape and width gradually decreasing toward the inner periphery of said axial end face along the direction of the shaft rotation, and said bearing further includes grooves on the inner peripheral surface at the positions corresponding to the maximum width of said depressed portions.

6. In a hydrodynamic thrust porous bearing which is approximately cylindrical in configuration and receives thrust load on its axial end face and radial load on its inner peripheral surface, the improvement which is characterized in that said bearing includes, in at least three positions in said axial end faces to receive thrust load, protruded portions disposed radially relative to its center, tapered portions formed on at least one side of said protruded portions, and depressed portions adjacent to said tapered portions having spiral shape and width gradually decreasing toward the outer periphery of said axial end face along the direction of the shaft rotation, and said bearing further includes grooves on the inner peripheral surface at the positions corresponding to the maximum width of said depressed portions.

7. In a hydrodynamic thrust porous bearing which is approximately cylindrical in configuration and receives thrust load on its axial end face and radial load on its inner peripheral surface, the improvement which is characterized in that said bearing includes, in at least three positions in said axial end faces to receive thrust load, protruded portions disposed radially relative to its center, tapered portions formed on at least one side of said protruded portions, and depressed portions adjacent to said tapered portions having an arrowhead shape and width gradually decreasing from the inner periphery and outer periphery to arbitrary radius of said axial end face along the direction of the shaft rotation, and said bearing further includes grooves on the inner peripheral surface at the positions corresponding to the maximum width of said depressed portions.

8. The hydrodynamic thrust porous bearing as claimed in any one of claims 1 to 7, which is characterized in that the number of said protruded portion is a prime number of three or more.

9. The hydrodynamic thrust porous bearing as claimed in claim 1 which is characterized in that said grooves in the inner peripheral surface are formed at an angle of 45° or less relative to the longitudinal direction of said bearing.

10. The hydrodynamic thrust porous bearing as claimed in claim 1 which is characterized in that said bearing includes a relieved inner peripheral surface having a diameter larger than the shaft contacting inner peripheral surfaces, which are formed in more than one positions of said inner peripheral surface.

11. The hydrodynamic thrust porous bearing as claimed in claim 1 which is characterized in that the difference in height between said protruded portions and said depressed portions is in the range of 5 to 100 $\mu$m and the shape of said depressed portions decreasing in width toward inner periphery or outer periphery of said axial end face, is defined by straight lines, curved lines or their combination, each of said lines begins with an angle in the range of 5° to 45° relative to the tangent line to said inner periphery or outer periphery.

12. The hydrodynamic thrust porous bearing as claimed in claim 1 which is characterized in that said grooves are formed lengthwise in the inner peripheral surface or the outer peripheral surface or in both the inner and outer peripheral surfaces in the positions corresponding to the maximum width of said depressed portions or at the tapered depressed portions formed on said axial end face.

13. An electric motor in which said hydrodynamic thrust porous bearing as claimed in claim 1 is mounted.

\* \* \* \* \*